Sept. 1, 1925.
G. MOE
1,551,681
BIRD TAIL STEERING DEVICE FOR AEROPLANES AND THE LIKE
Filed Feb. 16, 1923   2 Sheets-Sheet 1
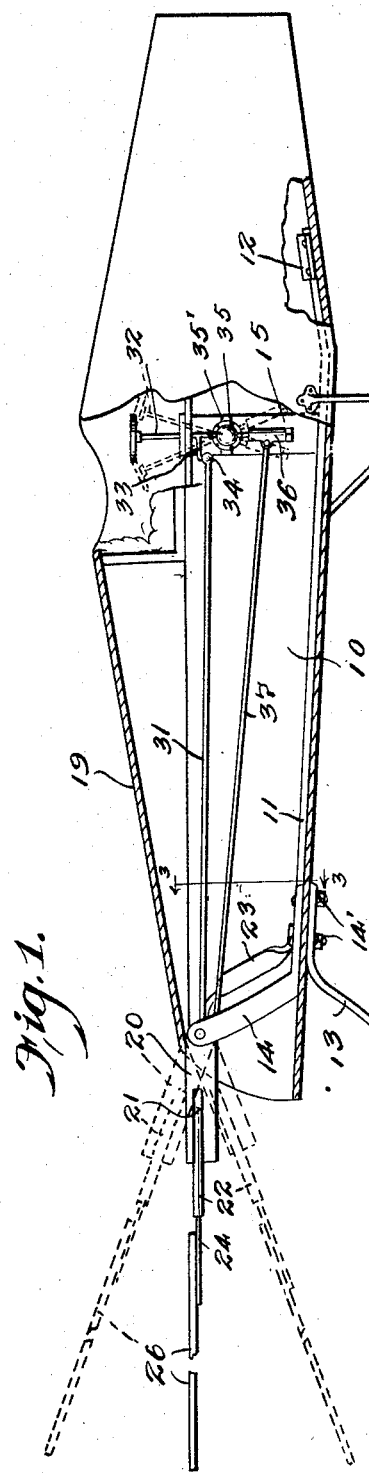
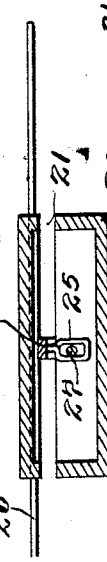
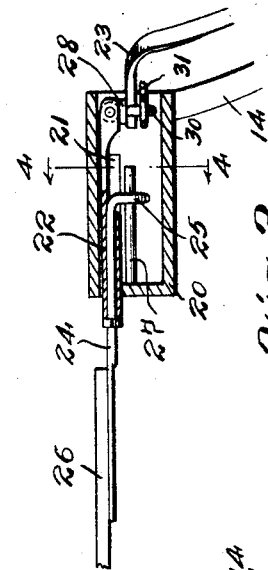
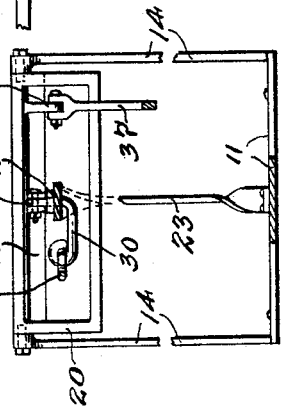
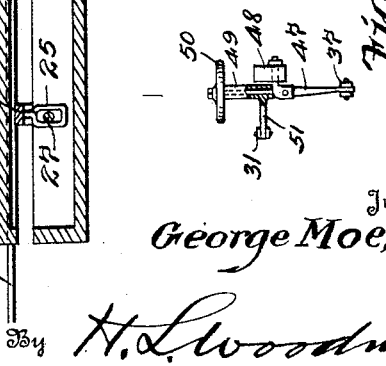
Inventor
George Moe,
By H. L. Woodward
Attorney Sept. 1, 1925.
G. MOE
1,551,681
BIRD TAIL STEERING DEVICE FOR AEROPLANES AND THE LIKE
Filed Feb. 16, 1923    2 Sheets-Sheet 2
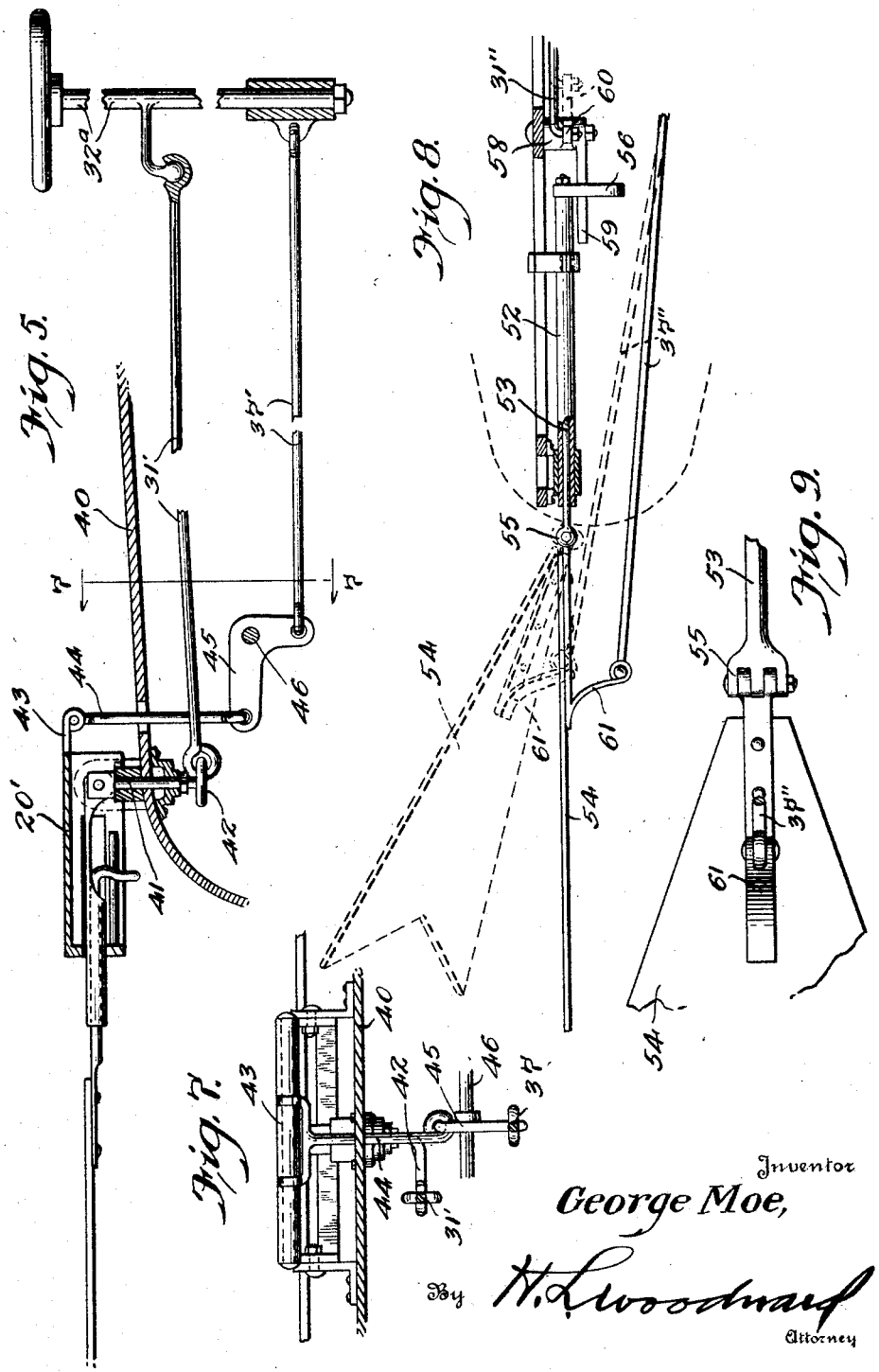
Inventor
George Moe,
By H. L. Woodward
Attorney Patented Sept. 1, 1925.

1,551,681

UNITED STATES PATENT OFFICE.

GEORGE MOE, OF SAGINAW, MICHIGAN.

BIRD-TAIL STEERING DEVICE FOR AEROPLANES AND THE LIKE.

Application filed February 16, 1923. Serial No. 619,424.

*To all whom it may concern:*

Be it known that I, GEORGE MOE, a citizen of the United States, residing at Saginaw, in the county of Saginaw and State of Michigan, have invented certain new and useful Improvements in Bird-Tail Steering Devices for Aeroplanes and the like, of which the following is a specification.

The invention has for an object to effect improvements in rudder controls for aeroplanes, and particularly to provide means whereby a single rudder element may be moved from right to left, or up and down, or with components of these motions in various proportions, and to at the same time effect a rotation of the rudder on its fore and aft axis, as required. It is an important aim of the invention to present an extremely simple structural embodiment of such apparatus, to the end that it may be manufactured at a low cost and installed at a minimum expenditure. It is a further important aim of the invention to provide a unit control device which, including the rudder and the control wheel and lever may be removed bodily from a fuselage, without disturbing the operative relation of the parts, or the structural form of the body of the fuselage. By this means, in case there is impairment of a steering mechanism or parts thereof, the entire control device may be removed from a craft and an interchangeable assembled unit—which may have been properly tested—substituted, thus avoiding delay in the use of the craft.

It is also a purpose to give an effective mounting for a rudder movable in the manner indicated, to the end that it will have the necessary strength and dependability, positiveness in function in its movement in response to operation of a controlling wheel or lever, and whereby it will exert the desired effect in controlling the movement of an aircraft upon which it is incorporated.

It is also an aim of the invention to provide novel mechanical or machine elements for effecting the control of a rudder of the general type described. A further aim is to provide a device of this character which will require a minimum of operative connections between the control wheel or lever and the rudder element.

Additional objects, advantages and features of invention will appear from the construction, arrangement and combination of parts, as may be understood from the following description and the accompanying drawings, wherein, Figure 1 is a longitudinal sectional view of the fuselage of an aeroplane, upon which my invention is incorporated, the wing elements and power plant of the craft being omitted.

Fig. 2 is a fragmentary cross sectional detail of the immediate mounting of the rudder element.

Fig. 3 is a view on the line 3—3 of Fig. 1, looking toward the rear.

Fig. 4 is a cross section on the line 4—4 of Fig. 2.

Fig. 5 is an elevational view of a modified form of the mechanism, with parts in section, the body of the fuselage being omitted.

Fig. 6 is a detail of the control wheel.

Fig. 7 is cross section on the line 7—7 of Fig. 5, looking toward the rear.

Fig. 8 is a fragmentary elevational view of a further modification of the rudder and control construction, with parts in section, adapted to be used with the same form of control wheel shown in Fig. 5, the latter parts being omitted.

Fig. 9 is a bottom view of part of the structure shown in Fig. 8.

There is illustrated in Fig. 1 the fuselage 10 of an air craft, which represents a sheet metal body, which, however, may have reinforcements as required, these not being shown. A control frame is removably mounted in the fuselage, comprising a keel piece 11, which is adapted to be laid in the bottom of the fuselage extending from adjacent the rear end to a point immediately in advance of the control wheel, a socket 12 being provided on the bottom of the fuselage into which the forward end of the element 11 is snugly inserted, and adapted to be removed by a rearward pull. Adjacent the rear of the craft, a tail skid or drag 13 is mounted upon the fuselage, suitable bolts 14' being inserted through this and through the keel piece 11, by which the keel piece is removably held in place. At the rear, upwardly extending bracket arms 14 are mounted upon the keel piece, adapted to lie closely adjacent respective sides of the fuselage. Near the forward end of the keel piece, larger lateral arms 15 are formed thereon, adapted to extend upwardly snugly within the body of the fuselage closely adjacent the cock-pit. A seat 16 is provided within the cock-pit, so arranged that when the bolts 14' are removed, the complete frame including the keel piece 11 and the arms 14 and 15 with the parts mounted therein may be drawn rearwardly through the rear end of the fuselage. The fuselage is also preferably provided with a removable top piece 19 at the rear part, removal of which will facilitate lifting out of the control frame and assembly. Pivoted between the bracket arms 14, there is a box element 20, having a guide slot 21 at the rear thereof, in which there is laterally oscillatable a sleeve 22, pivoted on a common axis with the box 20, and in the present instance, supported by a third bracket arm 23 extending from the keel piece. The sleeve 22 is open on the underside at the inner part and has revolubly mounted therein a rudder shaft 24, from which there depends at the inner end a longitudinally slotted crank arm 25, shown in Figs. 2 and 4, while at the rear, a rudder 26 of suitable shape is mounted on the shaft. A pin 27 is fixed at the rear part of the box 20, extending forwardly in the medial vertical longitudinal plane of the device, so that upon lateral oscillation of the sleeve 22, the pin will operate upon the crank 25 to turn the rudder in corresponding direction. The pivotal mounting of the sleeve 22 in the present instance, comprises a swivel element or pin 28 having an ear 29 at the upper end upon which the bifurcated end of the sleeve 22 is pivoted, the pin 28 being set in a horizontal part of the bracket arm 23, and at its lower part provided with a crank arm 30 from which an operating link 31 extends forwardly to a universally pivoted and revolubly mounted control lever 32, which is provided with a lateral arm 33 above its pivot, having a downward extension at its outer part which comes closely adjacent the level of the pivot and is connected to the link 31 by a universal joint at 34. The mounting 35 of the lever 32 may be secured upon a transverse element 35' extending between the forward arms 15 of the control frame. The lever 32 is projected a distance below the mounting 35, and is provided there with a revoluble sleeve 36 to which there is pivotally connected a link 37 which is connected to a downwardly extending arm or other part on the box 20, as at 38 in Fig. 3.

By this construction it will be observed that in the normal or neutral position of the lever 32, the rudder will lie as shown in Fig. 1, in horizontal position, with its shaft extending longitudinally in the medial vertical longitudinal plane of the fuselage. Upon rotation of the shaft 32, the sleeve 22 is moved in a corresponding direction, and the action of the pin 27 will cause the shaft to be rotated so that when it is at either side of the neutral position in the box, it will be given a lateral angle of incidence to air impacting thereagainst, in flight. At the same time, if desired, at any point in rotation of the shaft 32, it may be oscillated in a fore and aft direction, which will cause movement as desired of the box on its pivot with resultant movement of the rudder to give a vertical component of force to the effect exerted by the rudder. This vertical movement of the rudder may also be accomplished as will be understood, without rotation of the shaft 24 from its neutral position, if desired.

In Fig. 5 there is shown a modification of the construction in which the controlling lever 32$^a$ may be constructed as before described and provided with a similar mounting, this not being shown, and it may be connected in a similar way with two links 31' and 37'. In this instance, however, the box element 20' is pivoted in a bracket mounted on the rear part of the hull 40 of a craft, which may be a hydroplane, and this form of the device is particularly suitable for craft of that character. A centrally located swivelled shaft 41 is mounted in a suitable bearing medially of the box, but located on the hull body, and this shaft is provided with a lateral crank arm 42 to which the link 31' is connected. The rudder mounting within the box in this form is identical with that before described. The box in this instance is provided with a forwardly extending arm 43, to which there is connected a link 44 extending downwardly through a suitable slot in the hull to a bell-crank 45 mounted on a shaft 46 extending transversely of the hull, having a rearwardly extending arm engaged with the link 44, while the downwardly extending arm of the bell-crank is connected to the link 37'. The operation of this form of device is identical with that first described, as far as manipulation of the control lever is concerned, and the operation of the mechanical parts will be readily understood from the construction presented.

An alternative form of control lever adapted to be used in either of the forms of device described is shown in Fig. 6, wherein a non-revoluble shaft 47 is pivoted upon a suitable bracket 48, and has its lower end connected to the link 37. The shaft 47 extends above this pivot a distance and has mounted thereon a revoluble sleeve 49 carrying a hand wheel 50, and provided at an intermediate point with a lateral arm 51 which may be connected to the link 31 as shown. This lever responds in the same manner as those before described in its effect upon the rudder.

In Figs. 8 and 9 there is shown a modified construction of a rudder mounting and connections therewith, provided with a bearing sleeve 52 in which the rudder shaft 53 is revoluble, the rudder 54 being pivoted with a hinge joint 55 at the rear end of the shaft. The forward end of the shaft 53 is provided with a longitudinally slotted arm 56. A horizontally movable bell-crank 58 is mounted immediately in advance of the shaft 53, having a rearwardly extending arm 59 inserted through the crank 56, while the lateral arm 60 of the bell-crank has connected thereto a link 31″ corresponding to the links 31 and 31′ before mentioned and connected to a control lever device. The rudder 54 has an arm 61 projecting from its underside, to the end of which the link 37″ is connected, which is extended from the lower end of the control lever in the same manner as the links 37 and 37′ before mentioned. The sleeve 53 and the bell-crank 58 are adapted to be mounted upon the hull of a hydroplane, or upon the fuselage of an aeroplane, as required.

With the construction provided, the rudder may be adjusted as either a vertical or horizontal rudder, or to any desired intermediate position by means of the rotation of the control lever, and the angle of incidence may be varied as required by oscillation of the lever.

I do not regard the invention as limited to the particular structural details illustrated, and the invention within the scope of the claims may be embodied in various other forms.

What is claimed:—

1. In a device of the character described, an air craft body, a steering control unit removably mounted thereon including a longitudinally projecting element adapted to lie adjacent a forwardly located seat, a socket device receiving the last named element insertably, separate means to secure the unit against movement relatively to the craft body, an aerofoil mounted movably on the unit, a manual control device movably mounted on the unit, and operative connections between the control device and aerofoil, whereby a complete rudder and its manual controls may be attachably mounted as a unit in the fuselage.

2. In a device of the character described, an air craft body element, a control unit including a frame having a longitudinal member, a socket device on the bottom of the body to receive one end of the longitudinal member, means to secure the frame against longitudinal movement in the body, forward members on the frame adapted to be located adjacent an aviator, an aerofoil movably mounted on the frame, and manually operated control means therefor on the said forward member of the frame.

3. In a device of the character described, a pivoted element having a transverse guideway, an oscillatable member mounted for oscillation in the guide-way and revoluble on an axis radial to the axis of oscillation, means to oscillate the element first named, and means to rotate the oscillatable member on said axis, said two means last named including an oscillatable lever having a rotatable element thereon, a lateral arm on said rotatable element, operative connections between said arm and the oscillatable member for rotation of the latter, and operative connections between the lever and the first named pivoted element.

4. In a device of the character described, a laterally oscillatable and vertically oscillatable rudder element having a rudder revoluble thereon on its medial longitudinal axis, a lateral longitudinally slotted arm connected to the rudder, a stationary pin projected through the slot of said arm, and means to oscillate the rudder as desired.

In testimony whereof I have affixed my signature.

GEORGE MOE.